(12) United States Patent
Casey et al.

(10) Patent No.: US 11,025,796 B2
(45) Date of Patent: Jun. 1, 2021

(54) PLURALITY OF LINEAR SENSOR ARRAYS COMPRISING PLURAL PROCESS DIRECTION WIDTHS AND PHOTOSITES WITH SUBMICRON Y-AXIS ALIGNMENT BETWEEN ARRAYS

(71) Applicant: Xerox Corporation, Norwalk, CT (US)

(72) Inventors: Joseph F. Casey, Webster, NY (US); Gary D. Redding, Victor, NY (US); Robert P. Herloski, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 94 days.

(21) Appl. No.: 16/246,971

(22) Filed: Jan. 14, 2019

(65) Prior Publication Data

US 2020/0228674 A1 Jul. 16, 2020

(51) Int. Cl.
*H04N 1/028* (2006.01)
*H04N 1/195* (2006.01)
*H04N 1/58* (2006.01)
*H04N 1/48* (2006.01)

(52) U.S. Cl.
CPC ..... *H04N 1/19584* (2013.01); *H04N 1/02805* (2013.01); *H04N 1/19589* (2013.01); *H04N 1/486* (2013.01); *H04N 1/58* (2013.01)

(58) Field of Classification Search
CPC ............ G02F 1/133514; G02F 1/1333; G02F 1/134336; G02F 2201/52; H04N 5/2254; H04N 13/239; H04N 1/02805; H04N 1/19584; H04N 1/1911; H04N 1/1915; H04N 1/1918; H04N 1/19589; H04N 1/486; H04N 1/58; H04N 1/48
USPC .................................. 250/214 R, 239, 214.1
See application file for complete search history.

(56) References Cited

U.S. PATENT DOCUMENTS

| 5,148,268 | A | 9/1992 | Tandon et al. | |
|---|---|---|---|---|
| 6,961,157 | B2 * | 11/2005 | Tandon | H04N 1/486 250/208.1 |
| 7,990,528 | B2 | 8/2011 | Hosier et al. | |
| 8,129,258 | B2 | 3/2012 | Hosier et al. | |
| 8,212,197 | B2 * | 7/2012 | Tewinkle | H04N 5/335 250/208.1 |

OTHER PUBLICATIONS

U.S. Appl. No. 16/247,016, filed Jan. 14, 2019.

* cited by examiner

*Primary Examiner* — Que Tan Le
(74) *Attorney, Agent, or Firm* — Simpson & Simpson, PLLC

(57) ABSTRACT

A sensor array assembly including a first sensor array, a second sensor array and a mounting substrate. The first sensor array includes a first process direction width and a first photosite, while the second sensor array includes a second process direction width and a second photosite. The first and second sensor arrays are separately secured on the mounting substrate. The first photosite is in precision alignment with the second photosite.

26 Claims, 11 Drawing Sheets

PLURALITY OF LINEAR SENSOR ARRAYS COMPRISING PLURAL PROCESS DIRECTION WIDTHS AND PHOTOSITES WITH SUBMICRON Y-AXIS ALIGNMENT BETWEEN ARRAYS

TECHNICAL FIELD

The presently disclosed embodiments are directed to a sensor array, more particularly to a plurality of linear sensor arrays, and even more particularly to a plurality of linear sensor arrays having submicron y-axis alignment between arrays of photosites.

BACKGROUND

Sensor arrays comprising a plurality of linearly aligned photodiodes or photosites are well known in the art. For example, a linear sensor array commonly referred to as a full width sensor array includes an array or plurality of arrays of photosensors/photodiodes/photosites having a length equal or greater than the width of the substrate to be scanned, for example, similar to the full width array taught in U.S. Pat. No. 5,148,268. However, due to the existing equipment for fabricating such arrays, the arrays have limitations in that each sensor array includes a fixed number of rows of photosensors, e.g., four (4) rows.

In some instances, it may be desirable to form a sensor array having more than four rows of photosensors. However, in such instances, adjacent sets of four parallel rows of photosensors must be positioned and bonded to a mounting substrate. Thus, a wafer having a plurality of parallelly formed sensor arrays, with each array comprising four rows of photosites, must be sliced into sub-arrays, positioned on a mounting substrate and bonded thereto. Limitations inherent in conventional slicing and placement operations control the accuracy to which the sensor array assemblies can be formed. In short, repeatable, highly accurate aligned placement of adjacent sensor arrays is a difficult and time-consuming process which can only be performed to particular levels of accuracy and precision.

SUMMARY

The present disclosure sets forth embodiments of a plurality of linear sensor arrays with near perfect alignment between groups of sensor arrays, e.g., upper and lower sensor arrays, that result in several advantages over standard single array assemblies.

The foregoing embodiments of pluralities of linear sensor arrays provide a variety of advantages over known sensor arrays. For example, the present sensor arrays disclosed herein greatly increase image scanning speed by offsetting the sampling of the upper and lower arrays. Moreover, such sensor arrays provide the ability to perform double, triple, etc. sampling to reduce noise, i.e., detecting the same spot twice or more, or in other terms detecting the same spot with each grouped sensor array. Still further, the present sensor arrays may include various configurations of color filters provide advantages over known color scanning systems. For example, true four-color scanning at one thousand two hundred (1,200) dots per inch (dpi) as well as eight (8) color image scanning is possible. The various embodiments allow for improved spatially resolved spectrophotometric measurements across an entire array over known scanning systems.

According to aspects illustrated herein, there is provided a sensor array assembly including a first sensor array, a second sensor array and a mounting substrate. The first sensor array includes a first process direction width and a first photosite, while the second sensor array includes a second process direction width and a second photosite. The first and second sensor arrays are secured on the mounting substrate. The first sensor array is positioned a first distance from the second sensor array, the first distance is greater than or equal to the first process direction width or the second process direction width, and the first photosite is in precision alignment with the second photosite.

According to other aspects illustrated herein, there is provided a sensor array assembly including a first sensor array, a second sensor array, a sacrificial zone and a mounting substrate. The first sensor array includes a first photosite, while the second sensor array includes a second photosite. The sacrificial zone is arranged between and connects the first sensor array and the second sensor array. The first and second sensor arrays are bonded on the mounting substrate. The sacrificial zone is removed after the first sensor array and the second sensor array are bonded to the mounting substrate and the first photosite is in precision alignment with the second photosite.

According to still other aspects illustrated herein, there is provided a sensor array assembly including a first sensor array, a second sensor array, a sacrificial zone and a mounting substrate. The first sensor array includes a first row of photosites and a second row of photosites, where the first row of photosites includes a first photosite, and the second row of photosites includes a second photosite. The second sensor array includes a third row of photosites and a fourth row of photosites, where the third row of photosites includes a third photosite, and the fourth row of photosites includes a fourth photosite. The sacrificial zone is arranged between the first sensor array and the second sensor array. The first and second sensor arrays are bonded on the mounting substrate. The sacrificial zone is removed after the first sensor array and the second sensor array are bonded to the mounting substrate and the first photosite is in precision alignment with the second photosite, the third photosite and the fourth photosite.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

Figure 1:
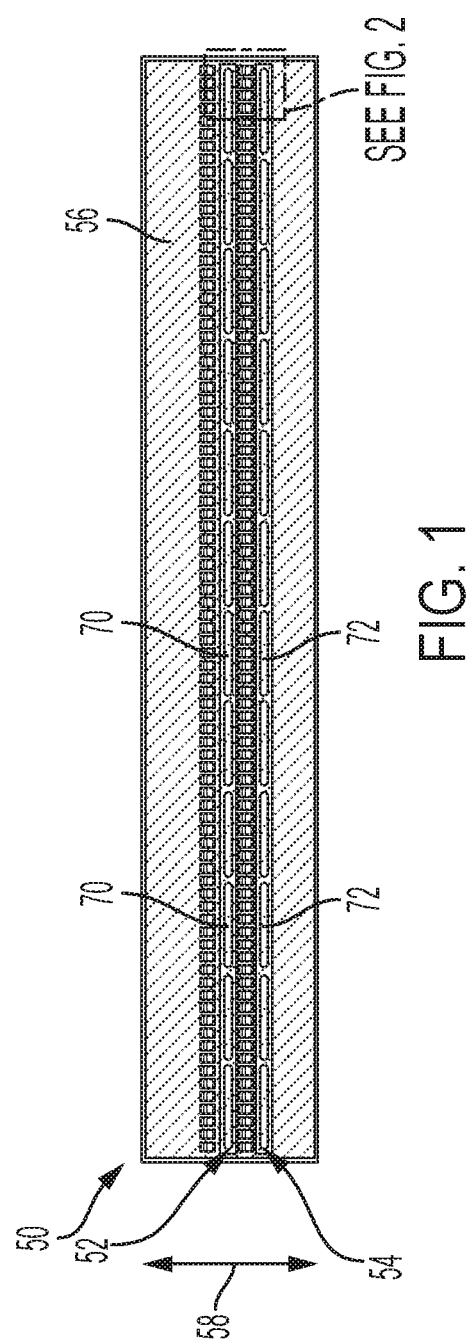
FIG. 1 is a top plan view of an embodiment of a presently disclosed plurality of linear sensor arrays, e.g., a dual linear sensor array.

At the outset, it should be appreciated that like drawing numbers on different drawing views identify identical, or functionally similar, structural elements of the embodiments set forth herein. Furthermore, it is understood that these embodiments are not limited to the particular methodologies, materials and modifications described and as such may, of course, vary. It is also understood that the terminology used herein is for the purpose of describing particular aspects only, and is not intended to limit the scope of the disclosed embodiments, which are limited only by the appended claims.

Unless defined otherwise, all technical and scientific terms used herein have the same meaning as commonly understood to one of ordinary skill in the art to which these embodiments belong. As used herein, "process direction" is intended to mean the direction of media transport through a printer, copier, scanner, etc., while "cross process direction" is intended to mean the perpendicular to the direction of media transport through a printer, copier, scanner, etc., or in other terms the perpendicular to the process direction. It should be appreciated that as used herein, "upper" and "lower" sensor arrays refer to two arrays offset in the process direction. For example, the upper sensor array is the first sensor array, relative to the process direction, that scans media moving in the process direction, while the lower sensor array is the second sensor array, relative to the process direction, that scans media moving in the process direction. As used herein, "precision alignment" and "sub-micron alignment" are intended to mean alignment within one micron or less. For example, the foregoing terms may be construed to mean photosite centerlines aligned to within +/−0.9 microns (μm); however, the terms are not limited to that accuracy. Moreover, it should be appreciated that the precision/submicron alignment described herein is believed to be maintained at temperatures below the glass transition temperature (Tg) of the bonding material used to secure the sensor array to the mounting substrate, e.g., adhesive. Additionally, it is believed that equivalent movement should occur for each sensor array bonded to the mounting substrate provided that equivalent amounts of bonding material are used for each sensor array. Furthermore, "trapezoid", as used herein, includes acute, right, obtuse, isosceles, parallelogram, three sides equal, rectangle, rhombus and square trapezoids.

Furthermore, as used herein, "printer," "printer system", "printing system", "printer device" and "printing device" encompasses any apparatus, such as a digital copier, book-making machine, facsimile machine, multi-function machine, etc. which performs a print outputting function for any purpose, while "multi-function device" and "MFD" as used herein is intended to mean a device which includes a plurality of different imaging devices, including but not limited to, a printer, a copier, a fax machine and/or a scanner, and may further provide a connection to a local area network, a wide area network, an Ethernet based network or the internet, either via a wired connection or a wireless connection. An MFD can further refer to any hardware that combines several functions in one unit. For example, MFDs may include but are not limited to a standalone printer, one or more personal computers, a standalone scanner, a mobile phone, an MP3 player, audio electronics, video electronics, GPS systems, televisions, recording and/or reproducing media or any other type of consumer or non-consumer analog and/or digital electronics. Additionally, as used herein, "sheet," "sheet of paper", "media", "printable media" and "paper" refer to, for example, paper, transparencies, parchment, film, fabric, plastic, photo-finishing papers or other coated or non-coated substrate media in the form of a web upon which information or markings can be visualized and/or reproduced.

It should be appreciated that as used herein terms such as "photosensor", "photosite", and "photodiode" are used interchangeably and are intended to mean an element, e.g., a semiconductor device, that converts light into an electrical energy such as current, which electrical energy can subsequently be used to quantify the amount, e.g., intensity, duration, etc., of light impinging on the element. A "photosensor array" is intended to mean a two dimensional (2D) array of photosites, such as for example, an array having four (4) parallel and adjacent rows of one hundred twenty-eight (128) photosites.

As used herein, the term 'average' shall be construed broadly to include any calculation in which a result datum or decision is obtained based on a plurality of input data, which can include but is not limited to, weighted averages, yes or no decisions based on rolling inputs, etc. Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, although any methods, devices or materials similar or equivalent to those described herein can be used in the practice or testing of these embodiments, some embodiments of methods, devices, and materials are now described.

Broadly, the present disclosure includes various embodiments of a sensor array assembly. Referring now to the figures, as shown, for example, in FIGS. 1 and 2, in some embodiments, sensor array assembly 50 comprises sensor array 52, sensor array 54 and mounting substrate 56. It should be appreciated that for the purposes of clarity, the process direction is designated by bi-directional arrow 58. Sensor array 52 comprises process direction width 60 and at least photosite 62. Sensor array 54 comprises process direction width 64 and at least photosite 66. Sensor arrays 52 and 54 are separately secured on mounting substrate 56. "Separately secured" as used herein is intended to mean that sensor arrays 52 and 54 are not in contact with each other; however, it is possible that both sensor arrays 52 and 54 are simultaneously secured to mounting substrate 56. Photosite 62 is in precision alignment with photosite 66. In some embodiments, sensor array 52 is positioned distance 68 from second array 54. Distance 68 is greater than or equal to process direction width 60 or process direction width 64.

It should be appreciated that each of sensor arrays 52 and 54 may be formed from a plurality of sub-arrays, e.g., sub-arrays 70 and 72, respectively. In some embodiments, sensor array 52 comprises at least two sub-arrays 70, each comprising a plurality of photosites, and sensor array 54 comprises at least two sub-arrays 72, each comprising a plurality of photosites. Each photosite of the plurality of photosites of the at least two sub-arrays 70 are in precision alignment with each complementary photosite the plurality of photosites of the at least two sub-arrays 72. "Complementary photosites", as used herein, is intended to mean photosites from aligned arrays that coincide with each other, e.g., the first photosite of each array, the second photosite of each array, etc. Moreover, each of sensor array 52 and 54 comprise a plurality of photosites, although for the purposes of clarity only one of each photosite per row have been labeled in the figures. Still further, each of sensor array 52 and 54 may comprise a plurality of rows of photosites.

As can be seen in the figures, sensor arrays 52 and 54 are in precision alignment relative to each other, which in turn results in photosite 62 and photosite 66 being in precision alignment relative to each other. The precision alignment is represented by broken line 74 showing the linear arrangement of photosites relative to process direction 58. Heretofore, the level of alignment possible between sensor arrays 52 and 54 was limited by slicing and placement operations. Sensor array assembly 50, due to its method of manufacture, includes precision aligned photosites between sensor arrays 52 and 54, which also includes precision aligned photosites 62 and 66. It should be appreciated that the foregoing method of manufacturing the various embodiments of the presently disclosed sensor array assemblies is fully described in the concurrently filed application entitled METHOD OF FABRICATING A PLURALITY OF LINEAR ARRAYS WITH SUBMICRON Y-AXIS ALIGNMENT.

Figure 9:
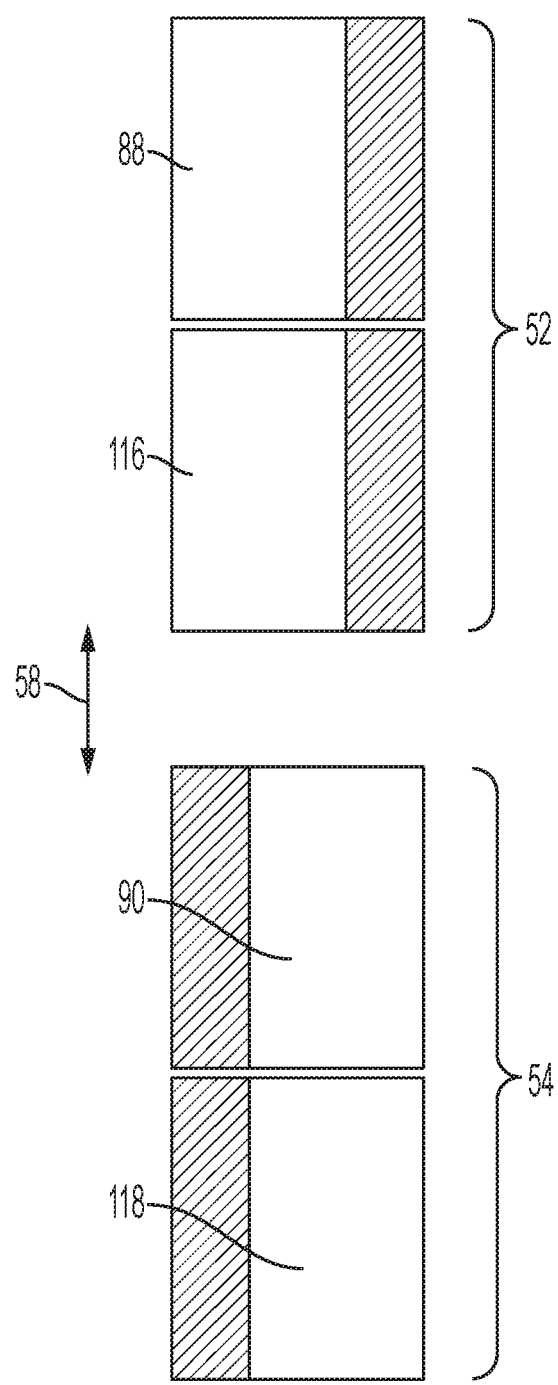
FIG. 9 is an enlarged top plan view of an embodiment of a portion of a first linear sensor array and a portion of a second linear sensor array in precision alignment relative to each other.

Referring now to FIGS. 3-8, in some embodiments, photosite 62 comprises masked portion 76 and unmasked portion 78, while photosite 66 comprises masked portion 80 and unmasked portion 82. In some embodiments, masked portion 76 is in alignment with unmasked portion 82 and masked portion 80 is in alignment with unmasked portion 78. The foregoing alignment is represented by broken lines 84 and 86 showing the linear arrangement of masked and unmasked portions relative process direction 58. Moreover, in some embodiments, unmasked portion 78 is not entirely aligned with masked portion 80. In such embodiments, unmasked portions from upper and lower sensor arrays may partially overlap each other. For example, as depicted in FIG. 9, unmasked portion 88 partially overlaps unmasked portion 90.

In some embodiments, each of unmasked portion 78 and unmasked portion 82 comprises a shape. For example, the shapes may include but are not limited to: a trapezoid; a triangle; a circle; an ellipse; a polygon comprising greater than four sides; and, a combination thereof. Embodiments of the foregoing shapes are represented by the various possible masked regions 91 depicted in FIGS. 10 through 12, wherein one or more of regions 91 may be included on each photosite. However, it should be appreciated that it is believed the performance of the sensor array assembly is improved when the arrangement of the various shapes of unmasked portions collectively result in a full unmasked photosite. For example, four aligned photosites, each including a different one-quarter portion left unmasked would collectively result in a fully unmasked photosite. Depending on the size and arrangement of the unmasked portions, varying quantities of dots per inch (dpi) may be scanned. Thus, for example, for an array that includes photosites arranged to scan at 600 dpi in both process and cross process directions, introducing unmasked portions equivalent to one half of each photosite (See, FIGS. 3 through 5) results in 1,200 dpi scanning in the cross process direction, while introducing unmasked portions equivalent to one quarter of each photosite (See, FIGS. 6 through 8) results in 1,200 dpi scanning in both the process and cross process directions.

In some embodiments, unmasked portion 78 comprises filter 92 and unmasked portion 82 comprises filter 94. In some embodiments, filter 92 passes a first spectrum, e.g., wavelengths ranging from about 480 nm to about 530 nm, and filter 94 passes a second spectrum, e.g., wavelengths ranging from about 530 nm to about 580 nm. In some embodiments, the first spectrum is different than the second spectrum, while in some embodiments the first spectrum is the same as the second spectrum.

In some embodiments, sensor array 52 comprises row of photosites 96 and row of photosites 98, while sensor array 54 comprises row of photosites 100 and row of photosites 102. Row of photosites 96 comprises at least photosite 62, row of photosites 98 comprises at least photosite 104, row of photosites 100 comprises at least photosite 66, row of photosites 102 comprises at least photosite 106. Photosite 62 is in precision alignment with photosite 66, photosite 104 and photosite 106. The foregoing alignment is represented by broken line 74 showing the linear arrangement of masked and unmasked portions relative process direction 58.

In some embodiments, photosite 62 comprises masked portion 76 and unmasked portion 78, photosite 66 comprises masked portion 80 and unmasked portion 82, photosite 104 comprises masked portion 108 and unmasked portion 110 and photosite 106 comprises masked portion 112 and unmasked portion 114. In some embodiments, masked portion 76 is in alignment with unmasked portion 82, masked portion 80 is in alignment with unmasked portion 78, masked portion 108 is in alignment with unmasked portion 114, and masked portion 112 is in alignment with unmasked portion 110. The foregoing alignment is represented by broken lines 84 and 86 showing the linear arrangement of masked and unmasked portions relative process direction 58. Moreover, in some embodiments, unmasked portion 78 is not entirely aligned with masked portion 80 and unmasked portion 110 is not entirely aligned with masked portion 112. In such embodiments, unmasked portions from upper and lower sensor arrays may partially overlap each other. For example, as depicted in FIG. 9, unmasked portion 88 partially overlaps unmasked portion 90 and unmasked portion 116 partially overlaps unmasked portion 118.

Figures 10, 11:
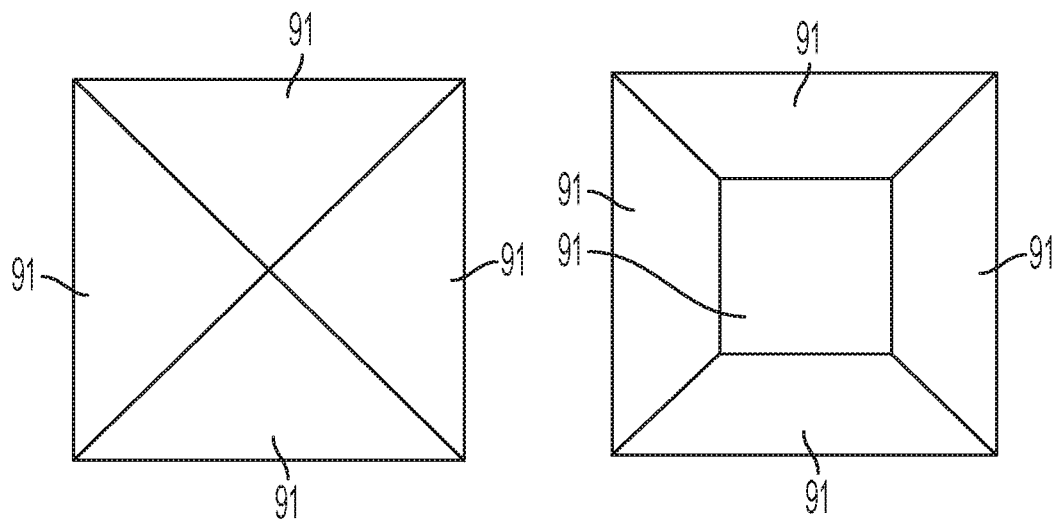
FIG. 10 is a top plan view of an embodiment of a single photosite including an embodiment of a mask.
FIG. 11 is a top plan view of an embodiment of a single photosite including an embodiment of a mask.
Figure 12:
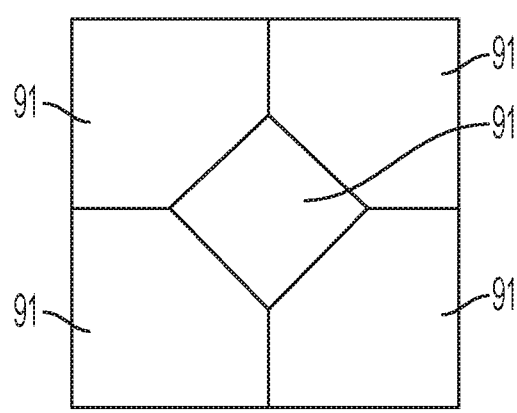
FIG. 12 is a top plan view of an embodiment of a single photosite including an embodiment of a mask.

In some embodiments, each of unmasked portion 78, unmasked portion 82, unmasked portion 110, and unmasked portion 114 comprises a shape. For example, the shapes may include but are not limited to: a trapezoid; a triangle; a circle; an ellipse; a polygon comprising greater than four sides; and, a combination thereof. Embodiments of the foregoing shapes are represented in FIGS. 10 through 12. However, it should be appreciated that it is believed the performance of the sensor array assembly is improved when the arrangement of the various shapes of unmasked portions collectively result in a full unmasked photosite. For example, four aligned photosites, each including a different one-quarter portion left unmasked would collectively result in a fully unmasked photosite. Depending on the size and arrangement of the unmasked portions, varying quantities of dots per inch (dpi) may be scanned. Thus, for example, for an array that includes photosites arranged to scan at 600 dpi in both process and cross process directions, introducing unmasked portions equivalent to one half of each photosite (See, FIGS. 3 through 5) results in 1,200 dpi scanning in the cross process direction, while introducing unmasked portions equivalent to one quarter of each photosite (See, FIGS. 6 through 8) results in 1,200 dpi scanning in both the process and cross process directions.

In some embodiments, unmasked portion 78 comprises filter 92, unmasked portion 82 comprises filter 94, unmasked portion 110 comprises filter 120, and unmasked portion 114 comprises filter 122. In some embodiments, filter 92 passes a first spectrum, e.g., wavelengths ranging from about 400 nm to about 450 nm, filter 94 passes a second spectrum, e.g., wavelengths ranging from about 490 nm to about 520 nm, filter 120 passes a third spectrum, e.g., wavelengths ranging from about 560 nm to about 590 nm, and filter 122 passes a fourth spectrum, e.g., wavelengths ranging from about 635 nm to about 700 nm. In some embodiments, the first spectrum is different than the second spectrum, the third spectrum and the fourth spectrum. In some embodiments, the first spectrum is same as at least one of the second spectrum, the third spectrum and the fourth spectrum.

Figure 13:
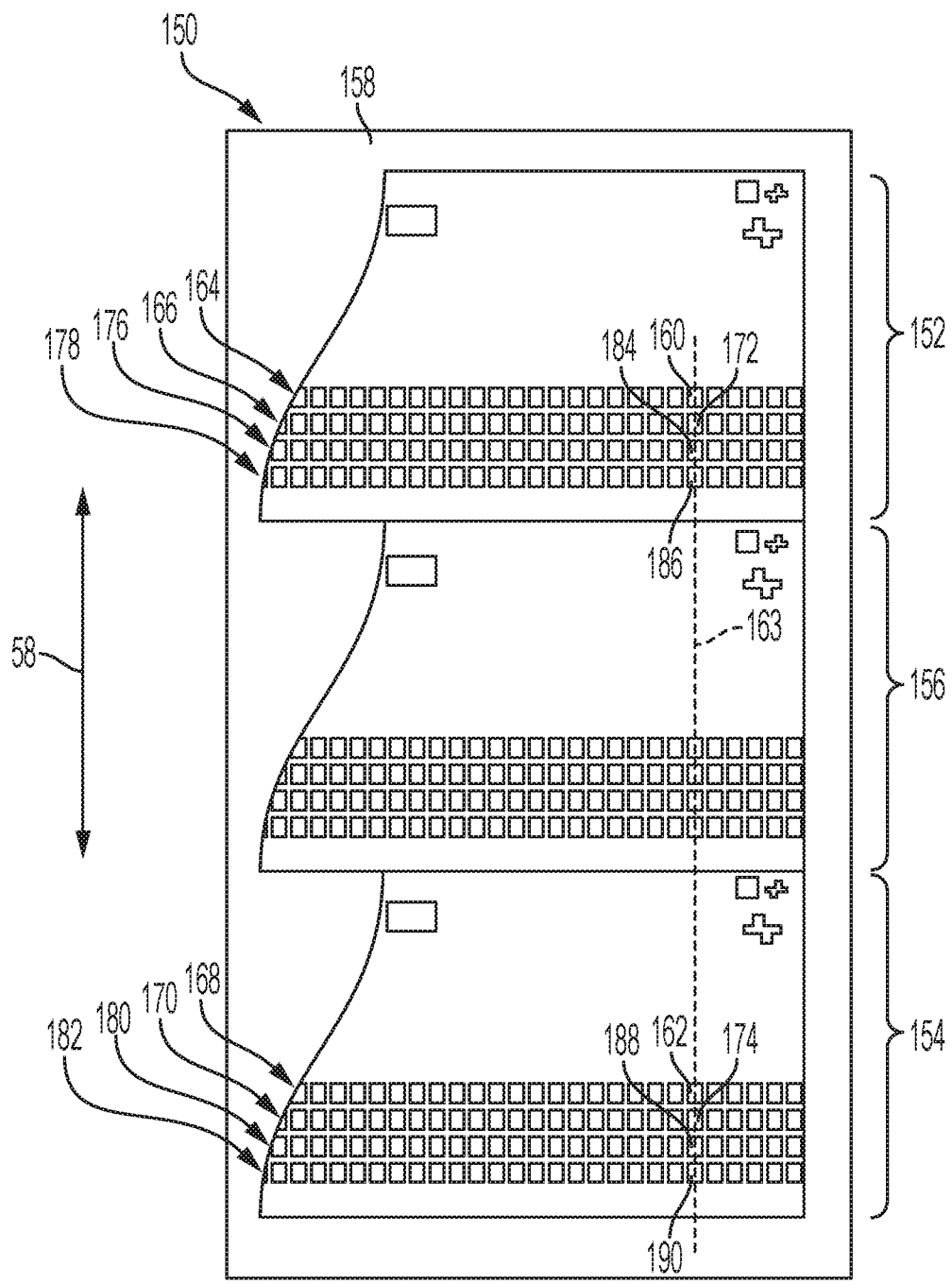
FIG. 13 is an enlarged top plan view of a portion of a first linear sensor array, a second linear sensor array and a sacrificial portion therebetween, where the first linear sensor array and the second linear sensor array are in precision alignment relative to each other.
Figure 14:
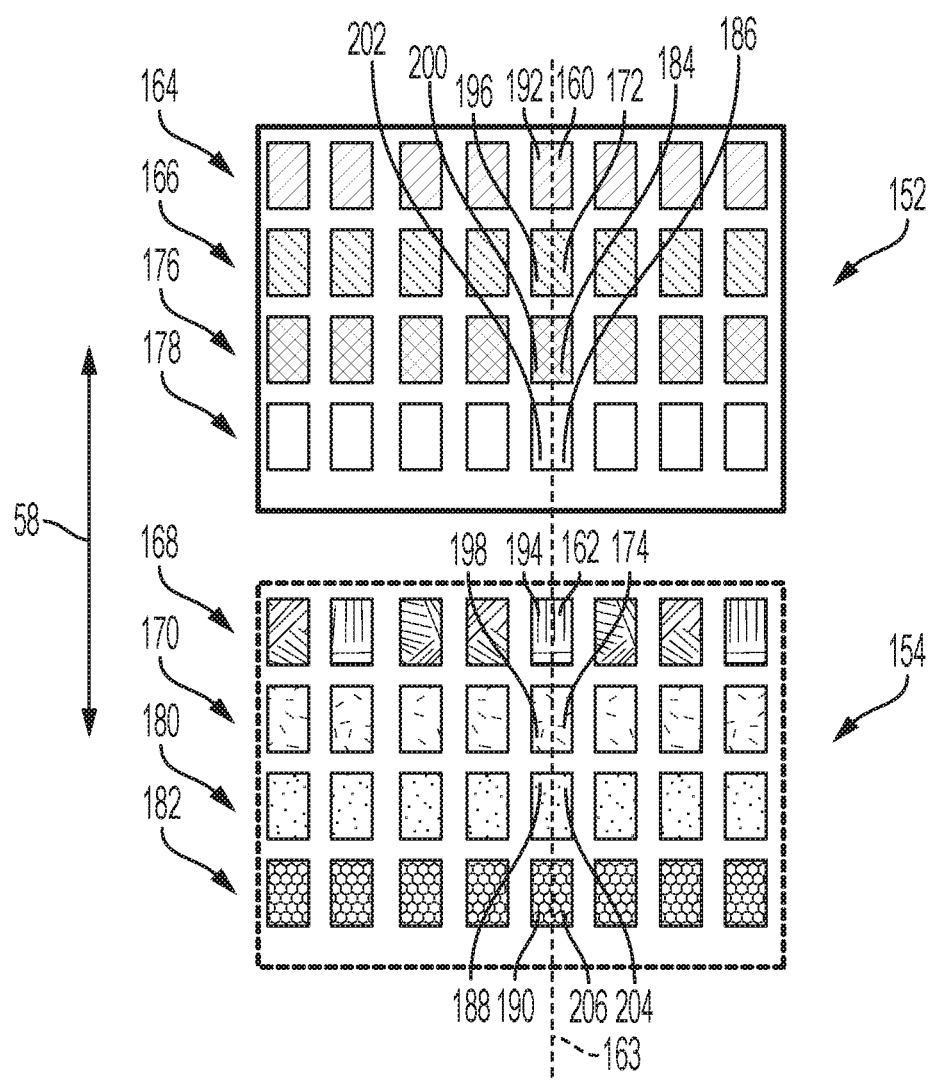
FIG. 14 is an enlarged top plan view of an embodiment of a portion of a first linear sensor array and a portion of a second linear sensor array in precision alignment relative to each other where each photosite in a respective row of photosites includes a filter.
Figure 15:
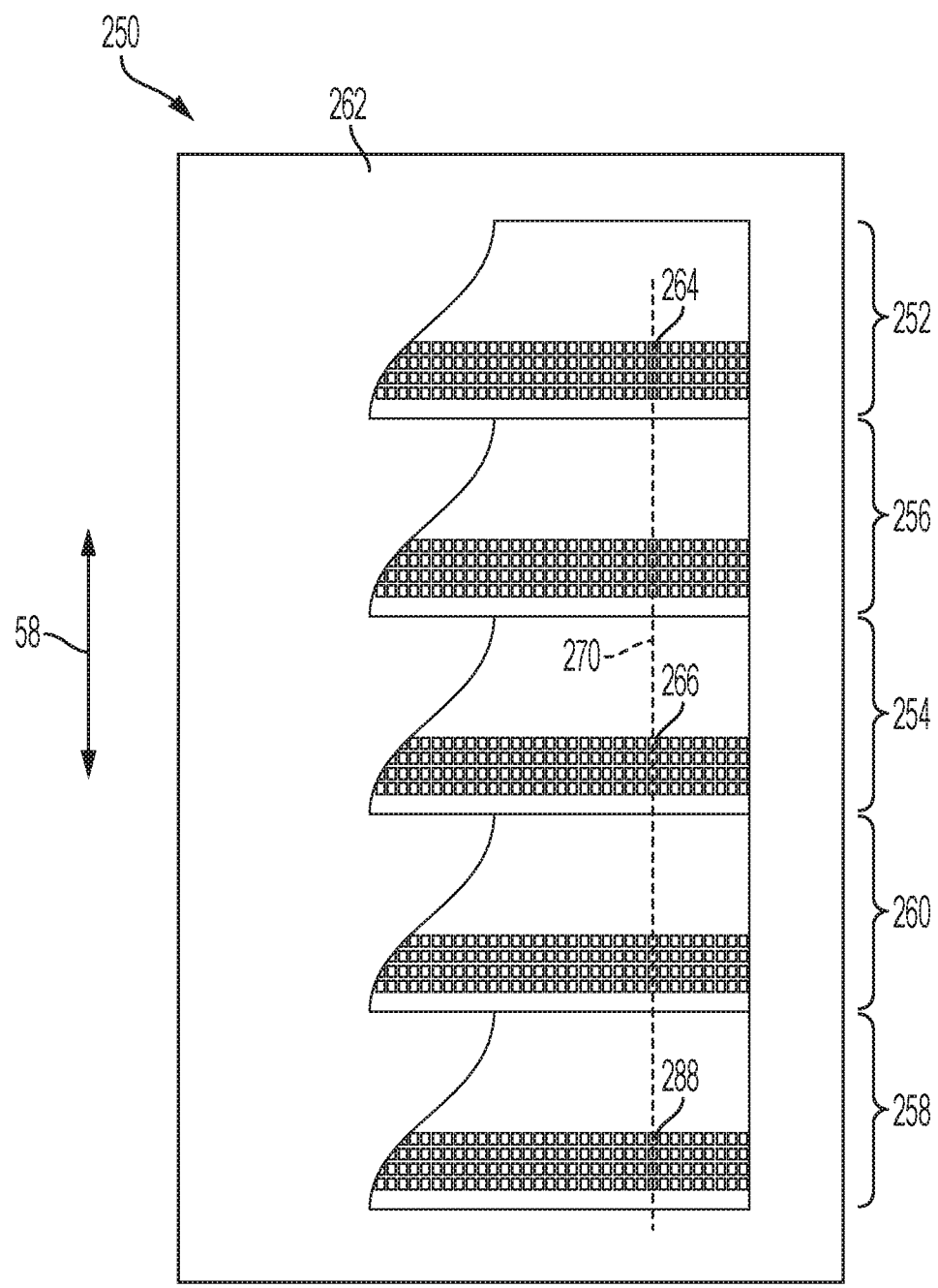
FIG. 15 is an enlarged top plan view of a portion of a first linear sensor array, a second linear sensor array, a third linear sensor array, a first sacrificial portion between the first and second linear sensor arrays, and a second sacrificial portion between the second and third linear sensor arrays, where the first linear sensor array, the second linear sensor array, and the third linear sensor array are in precision alignment relative to each other.

Broadly, the present disclosure includes other embodiments of a sensor array assembly. Referring now to FIGS. 13-15, in some embodiments, sensor array assembly 150 comprises sensor array 152, sensor array 154, sacrificial zone 156 and mounting substrate 158. Sensor array 152 comprises at least photosite 160, while sensor array 154 comprising at least photosite 162. Sacrificial zone 156 is arranged between and connects sensor arrays 152 and 154. Sensor arrays 152 and 154 are bonded to mounting substrate 158. Sacrificial zone 156 is removed after sensor arrays 152 and 154 are bonded to mounting substrate 158. Photosite 160 is in precision alignment with photosite 162. The precision alignment is represented by broken line 163 showing the linear arrangement of photosites relative to process direction 58. As described above, the method of manufacturing the various embodiments of the presently disclosed sensor array assemblies is fully described in the concurrently filed application entitled METHOD OF FABRICATING A PLURALITY OF LINEAR ARRAYS WITH SUBMICRON Y-AXIS ALIGNMENT. Moreover, the aforementioned application also describes how the sacrificial zone is form, utilized and lastly removed during the process of fabricating the various embodiments of the presently disclosed sensor array assemblies. In view of the foregoing, after removal of sacrificial zone 156, sensor arrays 152 and 154 are separately secured to mounting substrate 158.

Figure 2:
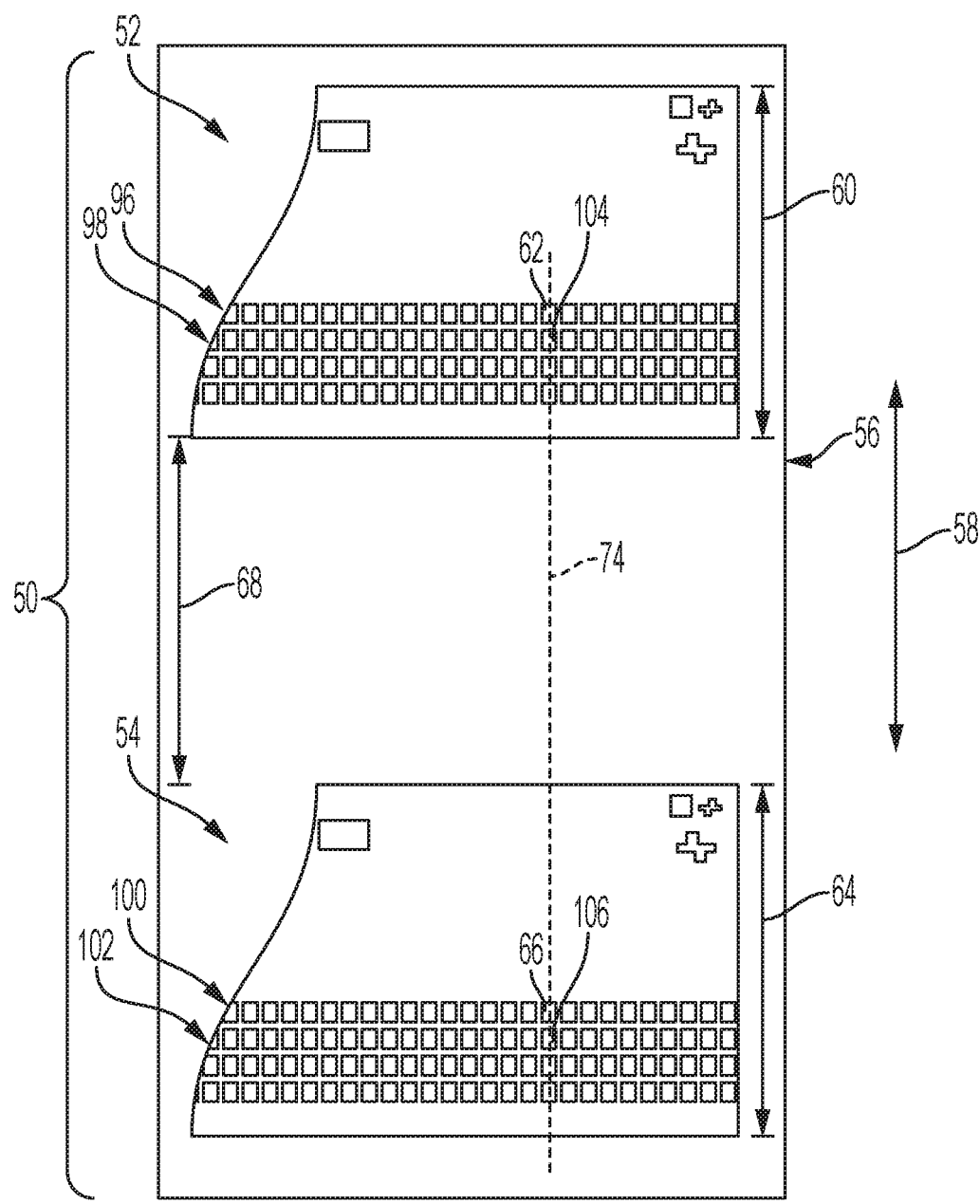
FIG. 2 is a top plan view of the encircled region 2 of FIG. 1.
Figure 3:
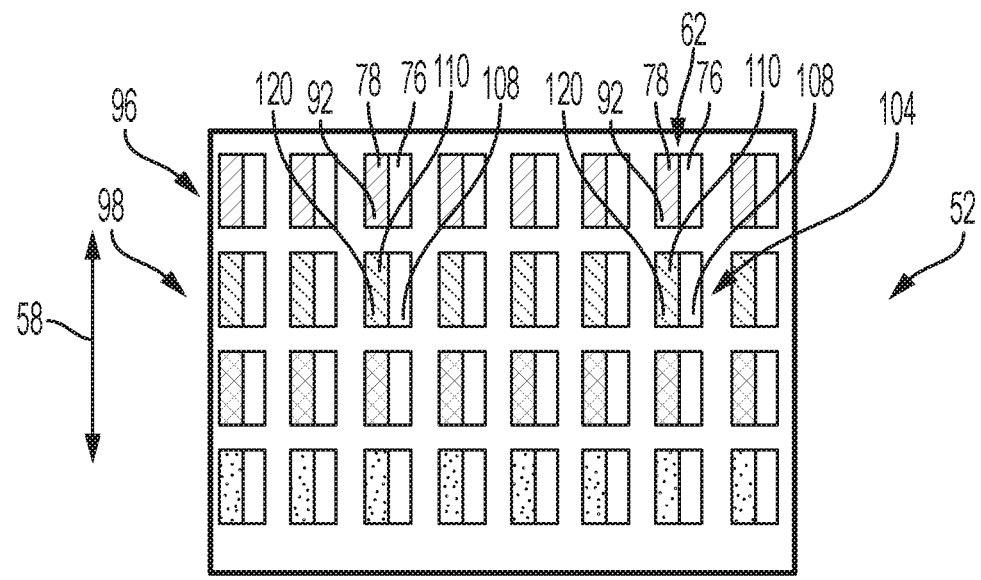
FIG. 3 is an enlarged top plan view of an embodiment of a portion of a first linear sensor array.
Figure 4:
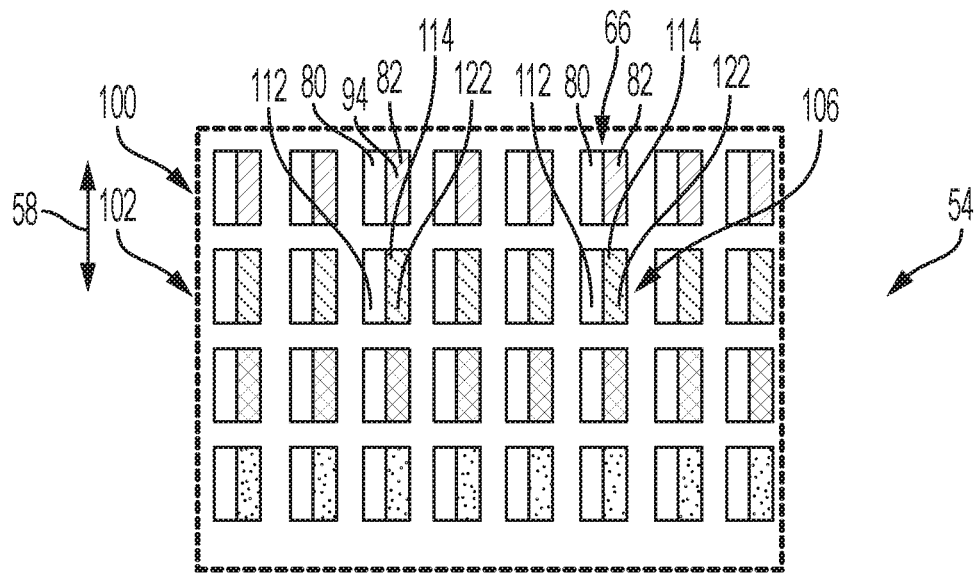
FIG. 4 is an enlarged top plan view of an embodiment of a portion of a second linear sensor array.
Figure 5:
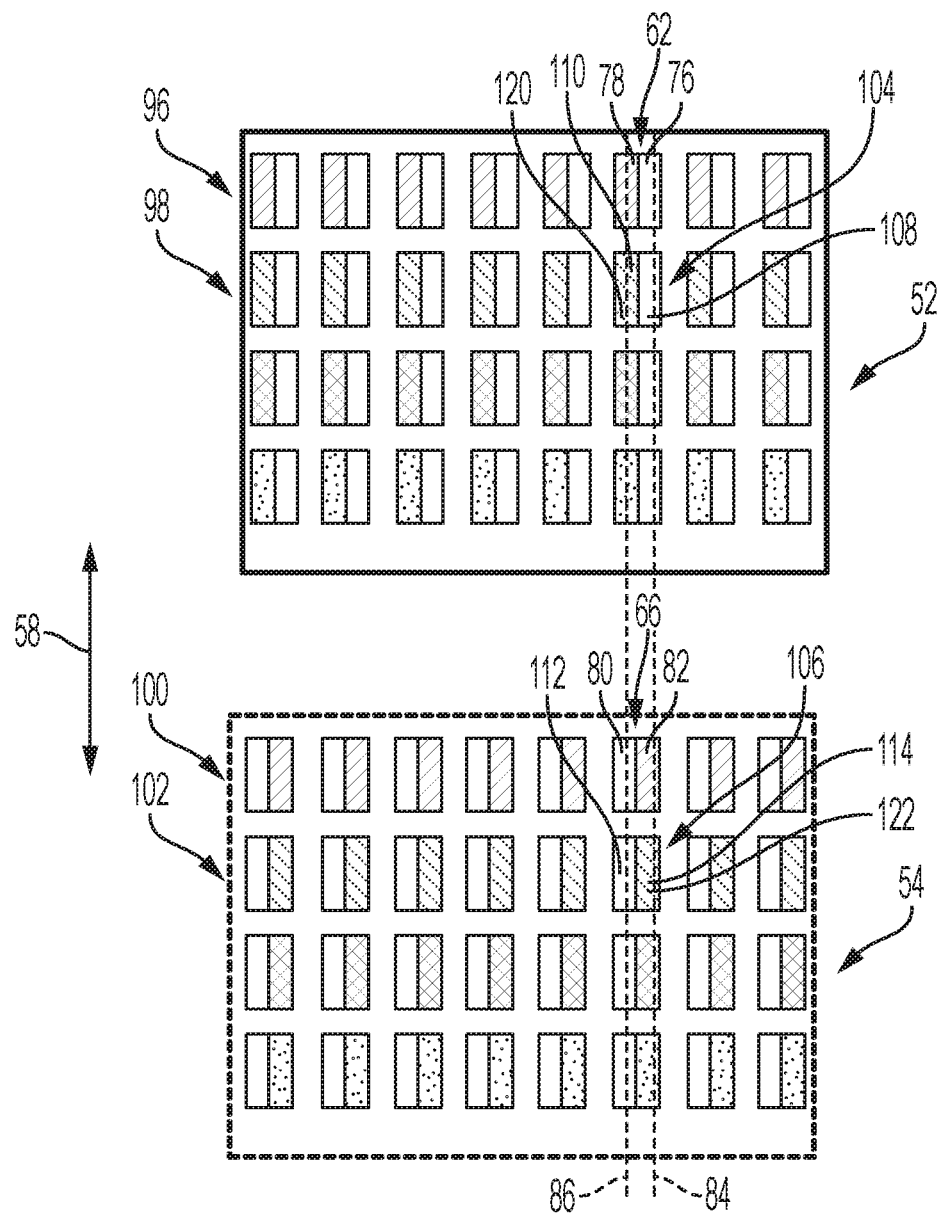
FIG. 5 is an enlarged top plan view of an embodiment of a portion of the first linear sensor array depicted in FIG. 3 and a portion of the second linear sensor array depicted in FIG. 4 in precision alignment relative to each other.
Figure 6:
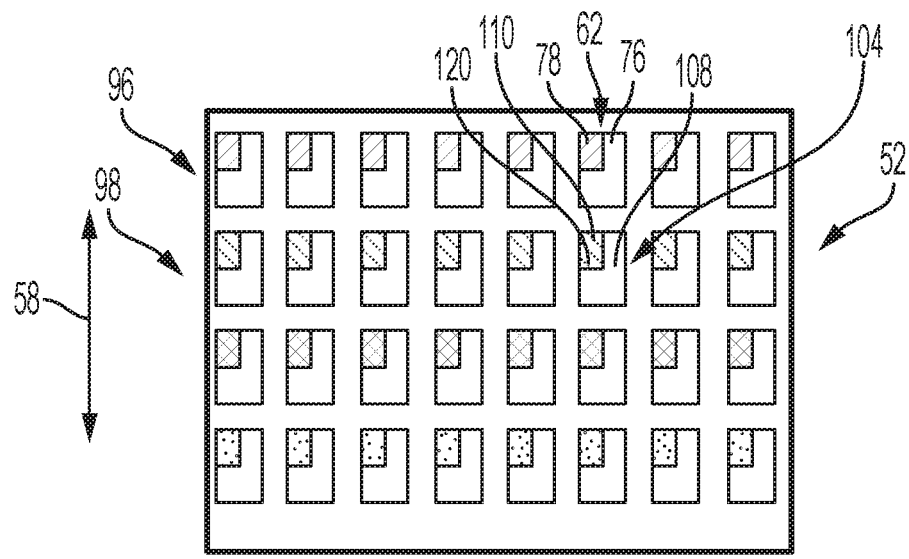
FIG. 6 is an enlarged top plan view of an embodiment of a portion of a first linear sensor array.
Figure 7:
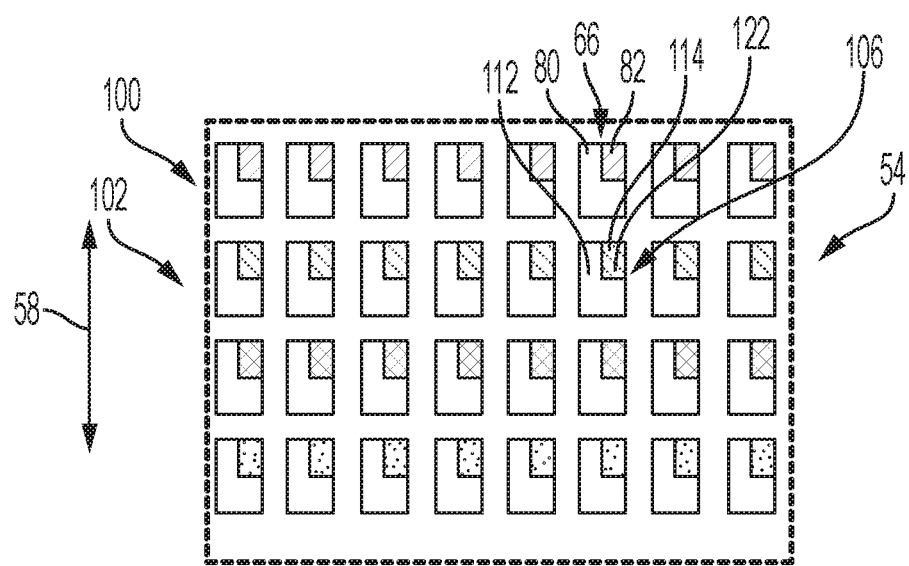
FIG. 7 is an enlarged top plan view of an embodiment of a portion of a second linear sensor array.
Figure 8:
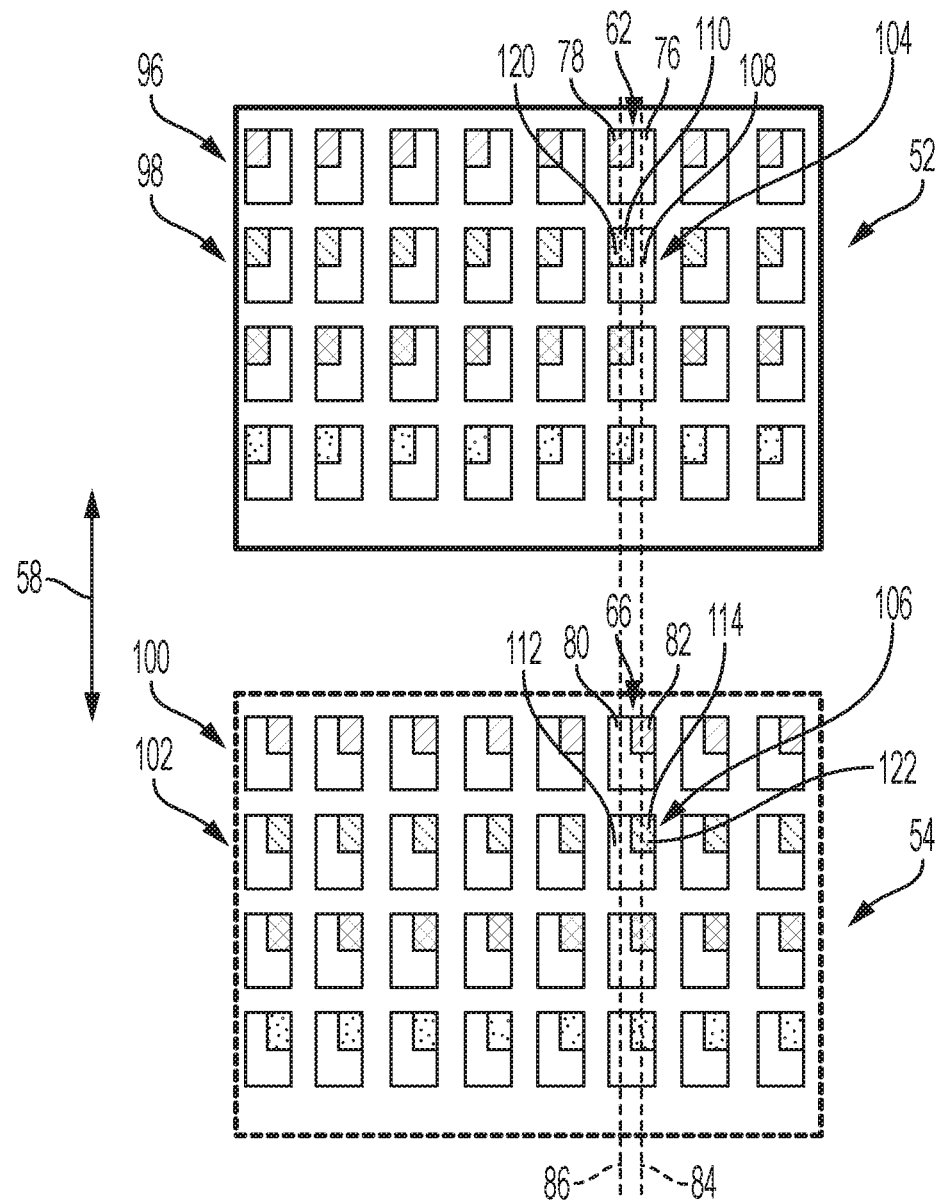
FIG. 8 is an enlarged top plan view of an embodiment of a portion of the first linear sensor array depicted in FIG. 6 and a portion of the second linear sensor array depicted in FIG. 7 in precision alignment relative to each other.

It should be appreciated that each of sensor arrays 152 and 154 may be formed from a plurality of sub-arrays, e.g., similar to the sub-arrays depicted in FIG. 1. Moreover, each of sensor array 152 and 154 comprise a plurality of photosites, although for the purposes of clarity only one of each photosite per row have been labeled in the figures. Still further, each of sensor array 152 and 154 may comprise a plurality of rows of photosites.

Broadly, the present disclosure includes other embodiments of a sensor array assembly. In some embodiments, sensor array assembly 150 comprises sensor array 152, sensor array 154, sacrificial zone 156 and mounting substrate 158. Sensor array 152 comprises row of photosites 164 and row of photosites 166. Row of photosites 164 comprises at least photosite 160, and row of photosites 166 comprises at least photosite 172. Sensor array 154 comprises row of photosites 168 and row of photosites 170. Row of photosites 168 comprises at least photosite 162, and row of photosites 170 comprises at least photosite 174. Sacrificial zone 156 is arranged between sensor array 152 and sensor array 154. Sensor arrays 152 and 154 are bonded to mounting substrate 158. Sacrificial zone 156 is removed after sensor arrays 152 and 154 are bonded to mounting substrate 158. Photosite 160 is in precision alignment with photosite 162, photosite 172 and photosite 174. In view of the foregoing, after removal of sacrificial zone 156, sensor arrays 152 and 154 are separately secured to mounting substrate 158.

It should be appreciated that each of sensor arrays 152 and 154 may be formed from a plurality of sub-arrays, e.g., similar to the sub-arrays depicted in FIG. 1. Moreover, each of sensor array 152 and 154 comprise a plurality of photosites, although for the purposes of clarity only one of each photosite per row have been labeled in the figures.

In some embodiments, sensor array 152 further comprises row of photosites 176 and row of photosites 178, and sensor array 154 further comprises row of photosites 180 and row of photosites 182. Row of photosites 176 comprises at least photosite 184, row of photosites 178 comprises at least photosite 186, row of photosites 180 comprises at least photosite 188, row of photosites 182 comprises at least photosite 190. Photosite 160 is in precision alignment with photosite 162, photosite 172, photosite 174, photosite 184, photosite 186, photosite 188, and photosite 190.

In some embodiments, for example, as shown in FIG. 14, photosite 160 comprises filter 192, photosite 162 comprises filter 194, photosite 172 comprises filter 196, photosite 174 comprises filter 198, photosite 184 comprises filter 200, photosite 186 comprises filter 202, photosite 188 comprises filter 204, and photosite 190 comprises filter 206. In some embodiments, filter 192 passes a first spectrum, e.g., wavelengths ranging from about 400 nm to about 450 nm, filter 194 passes a second spectrum, e.g., wavelengths ranging from about 450 nm to about 490 nm, filter 196 passes a third spectrum, e.g., wavelengths ranging from about 490 nm to about 520 nm, filter 198 passes a fourth spectrum, e.g., wavelengths ranging from about 520 nm to about 560 nm, filter 200 passes a fifth spectrum, e.g., wavelengths ranging from about 560 nm to about 590 nm, filter 202 passes a sixth spectrum, e.g., wavelengths ranging from about 590 nm to about 635 nm, filter 204 passes a seventh spectrum, e.g., wavelengths ranging from about 635 nm to about 700 nm, and filter 206 passes an eighth spectrum, e.g., wavelengths ranging from about 700 nm to about 730 nm. In some embodiments, the first spectrum is different than the second spectrum, the third spectrum, the fourth spectrum, the fifth spectrum, the sixth spectrum, the seventh spectrum and the eighth spectrum. In some embodiments, the first spectrum is the same as at least one of the second spectrum, the third spectrum, the fourth spectrum, the fifth spectrum, the sixth spectrum, the seventh spectrum and the eighth spectrum.

It should be appreciated that the embodiments of sensor arrays described above may include one or more color filters on precision aligned photosites. Thus, each column of photosites may act as a spectrophotometer providing spectral data from one or more measured values. For example, in embodiments having eight unique color filters, eight photosites in precision alignment relative to each other may provide eight unique spectral outputs for the same scanned area.

Moreover, it should be appreciated that the embodiments of sensor arrays described above may include more than two precision aligned sensor arrays. For example, as shown in FIG. 15, sensor array assembly 250 comprises sensor array 252 and sensor array 254 separated and connected by sacrificial zone 256, and further comprises sensor array 258 separated from sensor array 254 and connected by sacrificial zone 260. Sensor arrays 252, 254 and 258 are bonded to mounting substrate 262, similarly as described above relative to the other embodiments. Sensor array 252 comprises at least photosite 264, sensor array 254 comprises at least photosite 266 and sensor array 258 comprises at least photosite 268. It should be appreciated that as described above with respect to the other embodiments, sensor arrays 252, 254 and 258 each may comprise a plurality of photosites, and/or a plurality of rows of photosites. After sensor arrays 252, 254 and 258 are bonded to mounting substrate 262, sacrificial zones 256 and 260 are removed thereby leaving only sensor arrays 252, 254 and 258 bonded to mounting substrate 262. In these embodiments, photosites 264, 266 and 268, and thereby sensor arrays 252, 254 and 258, are in precision alignment with each other.

It should be appreciated that the various embodiments of a sensor array assembly set forth above permit added functionality to scanning operations and scanning apparatus that was previously more difficult and/or impractical to accomplish. For example, in view of the precision alignment of two or more sensor arrays, skew correction of the assembly within a scanning apparatus may be readily accomplished. The two or more sensor arrays, all mounted on a common substrate, may be rotated until each array detects a vertical image, e.g., a vertical line, in substantially the same, nearly exactly the same or exactly the same way. Additionally, an intention skew of the arrays could be introduced during assembly of the scanning apparatus. For example, the two or more sensor arrays may be intentionally skewed such that a first sensor array is shifted by half a pixel width relative to a second sensor array thereby allowing the first array to sense image data falling with the gaps between pixels (photosites) in the second sensor array. The foregoing arrangement should be capable of correcting for small pixel-to-pixel gaps which may be, for example, thirteen microns.

In view of the foregoing, it should be further appreciated that the present disclosure includes a plurality of linear sensor arrays fabricated on a single circuit board with submicron alignment between the arrays. Moreover, appropriate masking of the array photosites may yield a sensor having the capability to scan at a resolution of one thousand two hundred (1,200) dots per inch (dpi) in the process direction and/or cross process direction. Still further, the second, third, etc. precision aligned array provides the opportunity to apply additional filtering to the sensor thereby providing a higher fidelity spectrophotometer. The presently disclosed plurality of sensor arrays increases scan speed, improves resolution, permits redundant sampling and/or over-sampling, and is readily extendable to an eight (8) or more color image sensor.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A sensor array assembly comprising:
a first sensor array comprising a first process direction width and a first photosite;
a second sensor array comprising a second process direction width and a second photosite; and,
a mounting substrate whereon the first sensor array and the second sensor array are separately secured,
wherein the first photosite is in precision alignment with the second photosite.

2. The sensor array assembly of claim 1 wherein the first sensor array comprises at least two first sub-arrays each comprising a plurality of photosites, and the second sensor array comprises at least two second sub-arrays each comprising a plurality of photosites, and the plurality of photosites of the at least two first sub-arrays are in precision alignment with the plurality of photosites of the at least two second sub-arrays.

3. The sensor array assembly of claim 1 wherein the first sensor array is positioned a first distance from the second sensor array, the first distance is greater than or equal to the first process direction width or the second process direction width.

4. The sensor array assembly of claim 1 wherein the first photosite comprises a first masked portion and a first unmasked portion and the second photosite comprises a second masked portion and a second unmasked portion.

5. The sensor array assembly of claim 4 wherein the first masked portion is in alignment with the second unmasked portion, the second masked portion is in alignment with the first unmasked portion.

6. The sensor array assembly of claim 4 wherein the first unmasked portion is in partial overlapped alignment with the second unmasked portion.

7. The sensor array assembly of claim 4 wherein each of the first unmasked portion and the second unmasked portion comprises a shape selected from the group of: a trapezoid; a triangle; a polygon comprising greater than four sides; and, a combination thereof.

8. The sensor array assembly of claim 4 wherein the first unmasked portion comprises a first filter and the second unmasked portion comprises a second filter.

9. The sensor array assembly of claim 8 wherein the first filter passes a first spectrum and the second filter passes a second spectrum.

10. The sensor array assembly of claim 9 wherein the first spectrum is different than the second spectrum.

11. The sensor array assembly of claim 1 wherein the first sensor array comprises a first row of photosites and a second row of photosites, the second sensor array comprises a third row of photosites and a fourth row of photosites, the first row of photosites comprises the first photosite, the second row of photosites comprises a third photosite, the third row of photosites comprises the second photosite, the fourth row of photosites comprises a fourth photosite, and the first photosite is in precision alignment with the second photosite, the third photosite and the fourth photosite.

12. The sensor array assembly of claim 11 wherein the first photosite comprises a first masked portion and a first unmasked portion, the second photosite comprises a second masked portion and a second unmasked portion, the third photosite comprises a third masked portion and a third unmasked portion and the fourth photosite comprises a fourth masked portion and a fourth unmasked portion.

13. The sensor array assembly of claim 12 wherein the first masked portion is in alignment with the second unmasked portion, the second masked portion is in alignment with the first unmasked portion, the third masked portion is in alignment with the fourth unmasked portion, and the fourth masked portion is in alignment with the third unmasked portion.

14. The sensor array assembly of claim 12 wherein the first unmasked portion is in partial overlapped alignment with the second unmasked portion and the third unmasked portion is in partial overlapped alignment with the fourth unmasked portion.

15. The sensor array assembly of claim 12 wherein each of the first unmasked portion, the second unmasked portion, the third unmasked portion, and the fourth unmasked portion comprises a shape selected from the group of: a trapezoid; a triangle; a polygon comprising greater than four sides; and, a combination thereof.

16. The sensor array assembly of claim 12 wherein the first unmasked portion comprises a first filter, the second unmasked portion comprises a second filter, the third unmasked portion comprises a third filter, and the fourth unmasked portion comprises a fourth filter.

17. The sensor array assembly of claim 16 wherein the first filter passes a first spectrum, the second filter passes a second spectrum, the third filter passes a third spectrum, and the fourth filter passes a fourth spectrum.

18. The sensor array assembly of claim 17 wherein the first spectrum is different than the second spectrum, the third spectrum and the fourth spectrum.

19. The sensor array assembly of claim 1 further comprising:
a third sensor array comprising a third process direction width and a third photosite,
wherein the third sensor array is separately secured to the mounting substrate and the first photosite, the second photosite and the third photosite are in precision alignment with each other.

20. A sensor array assembly comprising:
a first sensor array comprising a first photosite;
a second sensor array comprising a second photosite;
a first sacrificial zone arranged between and connecting the first sensor array and the second sensor array; and,
a mounting substrate whereon the first sensor array and the second sensor array are bonded,
wherein the first sacrificial zone is removable after the first sensor array and the second sensor array are bonded to the mounting substrate and the first photosite is in precision alignment with the second photosite.

21. The sensor array assembly of claim 20 further comprising:
a third sensor array comprising a third photosite;
a second sacrificial zone arranged between and connecting the second sensor array and the third sensor array,
wherein the third sensor array is bonded to the mounting substrate, the second sacrificial zone is removable after the first sensor array, second sensor array and third sensor array are bonded to the mounting substrate and the first photosite, the second photosite, and the third photosite are in precision alignment with each other.

22. A sensor array assembly comprising:
a first sensor array comprising a first row of photosites and a second row of photosites, the first row of photosites comprises a first photosite, and the second row of photosites comprises a second photosite;
a second sensor array comprising a third row of photosites and a fourth row of photosites, the third row of photosites comprises a third photosite, and the fourth row of photosites comprises a fourth photosite;
a sacrificial zone arranged between the first sensor array and the second sensor array; and,
a mounting substrate whereon the first sensor array and the second sensor array are bonded,
wherein the sacrificial zone is removable after the first sensor array and the second sensor array are bonded to the mounting substrate and the first photosite is in precision alignment with the second photosite, the third photosite and the fourth photosite.

23. The sensor array assembly of claim 22 wherein the first sensor array further comprises a fifth row of photosites and a sixth row of photosites, and the second sensor array further comprises a seventh row of photosites and an eighth row of photosites, the fifth row of photosites comprises a fifth photosite, the sixth row of photosites comprises a sixth photosite, the seventh row of photosites comprises a seventh photosite, the eighth row of photosites comprises an eighth photosite, and the first photosite is in precision alignment with the second photosite, the third photosite, the fourth photosite, the fifth photosite, the sixth photosite, the seventh photosite, and the eighth photosite.

24. The sensor array assembly of claim 23 wherein the first photosite comprises a first filter, the second photosite comprises a second filter, the third photosite comprises a third filter, the fourth photosite comprises a fourth filter, the fifth photosite comprises a fifth filter, the sixth photosite comprises a sixth filter, the seventh photosite comprises a seventh filter, and the eighth photosite comprises an eighth filter.

25. The sensor array assembly of claim 24 wherein the first filter passes a first spectrum, the second filter passes a second spectrum, the third filter passes a third spectrum, the fourth filter passes a fourth spectrum, the fifth filter passes a fifth spectrum, the sixth filter passes a sixth spectrum, the seventh filter passes a seventh spectrum, and the eighth filter passes an eighth spectrum.

26. The sensor array assembly of claim 25 wherein the first spectrum is different than the second spectrum, the third spectrum, the fourth spectrum, the fifth spectrum, the sixth spectrum, the seventh spectrum and the eighth spectrum.

\* \* \* \* \*